United States Patent [19]

Voges

[11] 4,319,863
[45] Mar. 16, 1982

[54] GRAIN TRAILER AND BIN

[76] Inventor: Kenneth Voges, R.R. 2, Red Bud, Ill. 62278

[21] Appl. No.: 55,531

[22] Filed: Jul. 9, 1979

Related U.S. Application Data

[62] Division of Ser. No. 876,360, Feb. 6, 1978.

[51] Int. Cl.³ .............................................. B60P 1/04
[52] U.S. Cl. ................................................. 414/480
[58] Field of Search ................ 280/DIG. 8; 296/35.3, 296/35.1; 414/480

[56] References Cited

U.S. PATENT DOCUMENTS

| | | | |
|---|---|---|---|
| 2,981,210 | 4/1961 | Krueger | 280/DIG. 8 |
| 3,722,948 | 3/1973 | Walsh et al. | 296/35.3 |
| 3,788,683 | 1/1974 | Rumell | 296/35 A |

*Primary Examiner*—Stanley H. Tollberg
*Attorney, Agent, or Firm*—Rogers, Eilers & Howell

[57] ABSTRACT

A method for harvesting, transporting and storing grain utilizes small readily moved containers or bins in combination with a specially designed trailer mechanism to allow grain to be readily stored, as it is harvested, at the harvest site and then at a more convenient time transported to the place of ultimate use, sale or to centralized storage. The method utilizes a compact bin which may be stored in the field and yet be safe from weather and vermin, which may utilize additional drying mechanisms or which may utilize air drying of the grain. The bin is mounted on two permanent I-beam rails which are designed to mesh with roller trucks on a specially designed pick-up trailer. The pick-up trailer utilizes a frame having rails on which the roller trunks are carried. The trailer has a hydraulic lift mechanism to tilt the trailer to engage the leading edge of the I-beams of the bin to tilt the bin so that it can be self-loaded onto the trailer by backing the trailer underneath the bin. Guide mechanisms on the trailer centrally position the bin and the rails of the bin over the roller trucks carried by the trailer rails. A centering mechanism on the trucks also assists in correctly aligning the bin rails and the trucks. When the bin is loaded on the trailer, the trailer is lowered to the horizontal position with the bin loaded on the top of the trailer. Self latching mechanisms on the trailer engages the back edge of the bin I-beams to prevent the bin from sliding off the trailer when the trailer is in the horizontal position. Front stop mechanisms on the trailer prevent the forward motion of the bins once they have been loaded.

10 Claims, 12 Drawing Figures

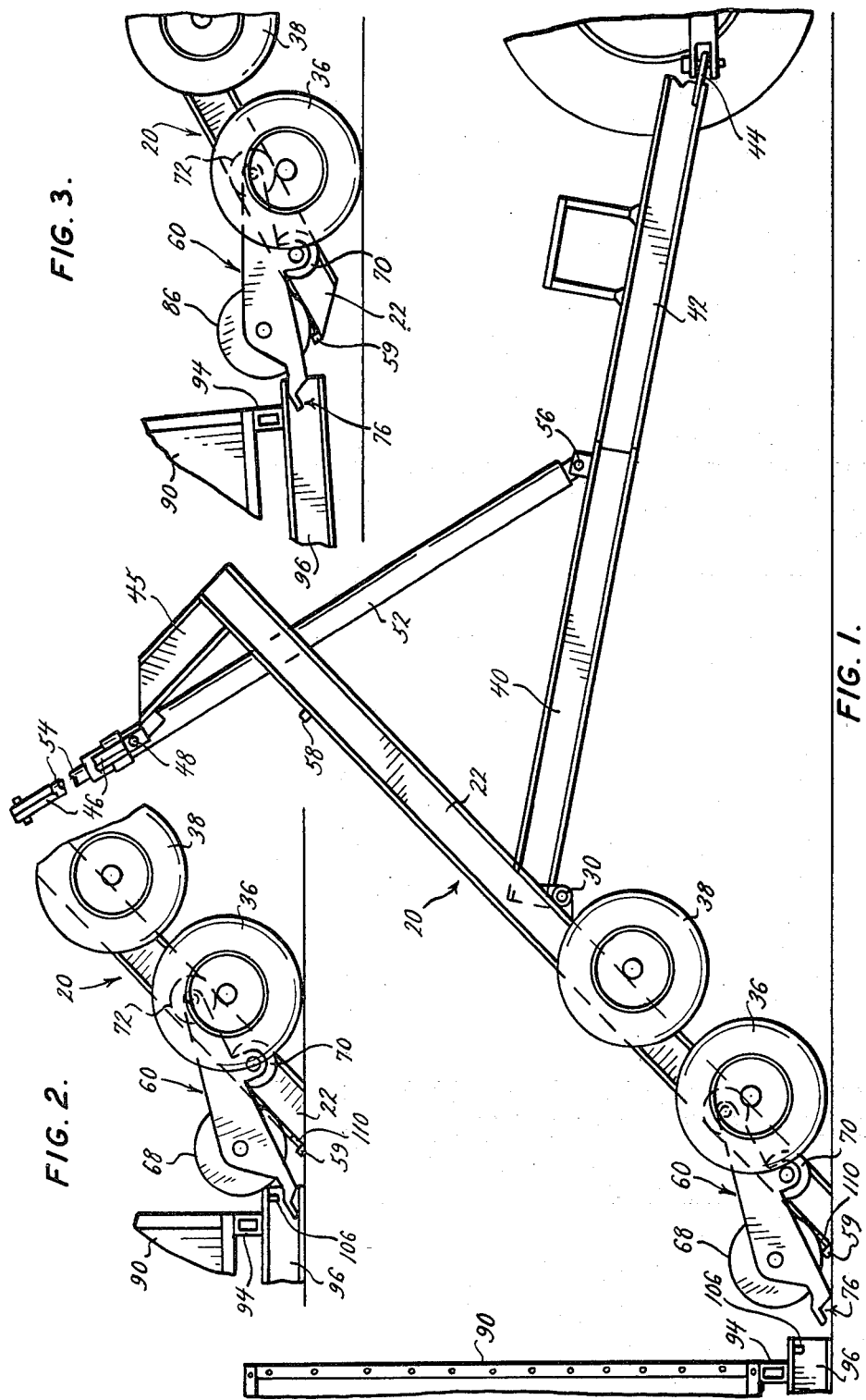

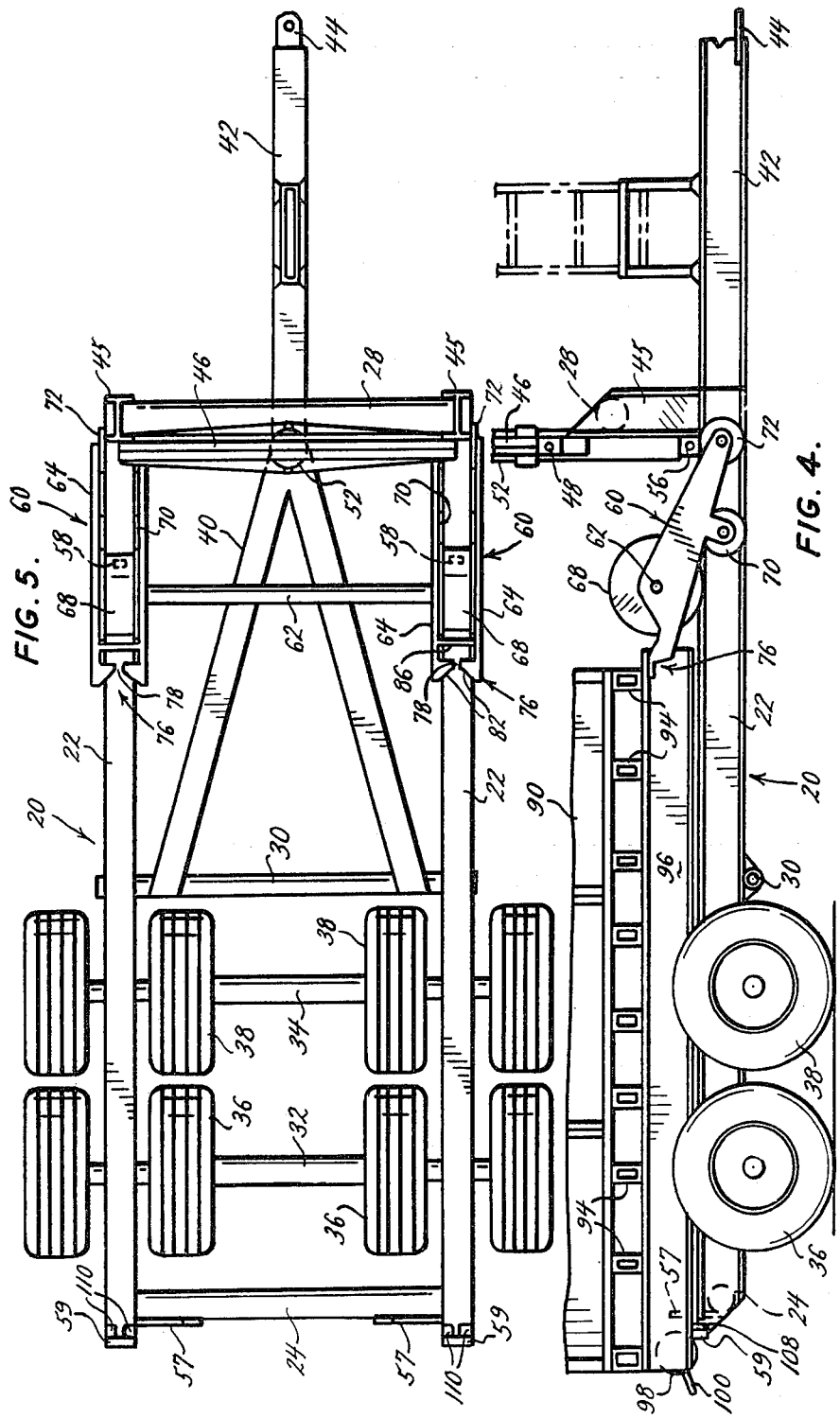

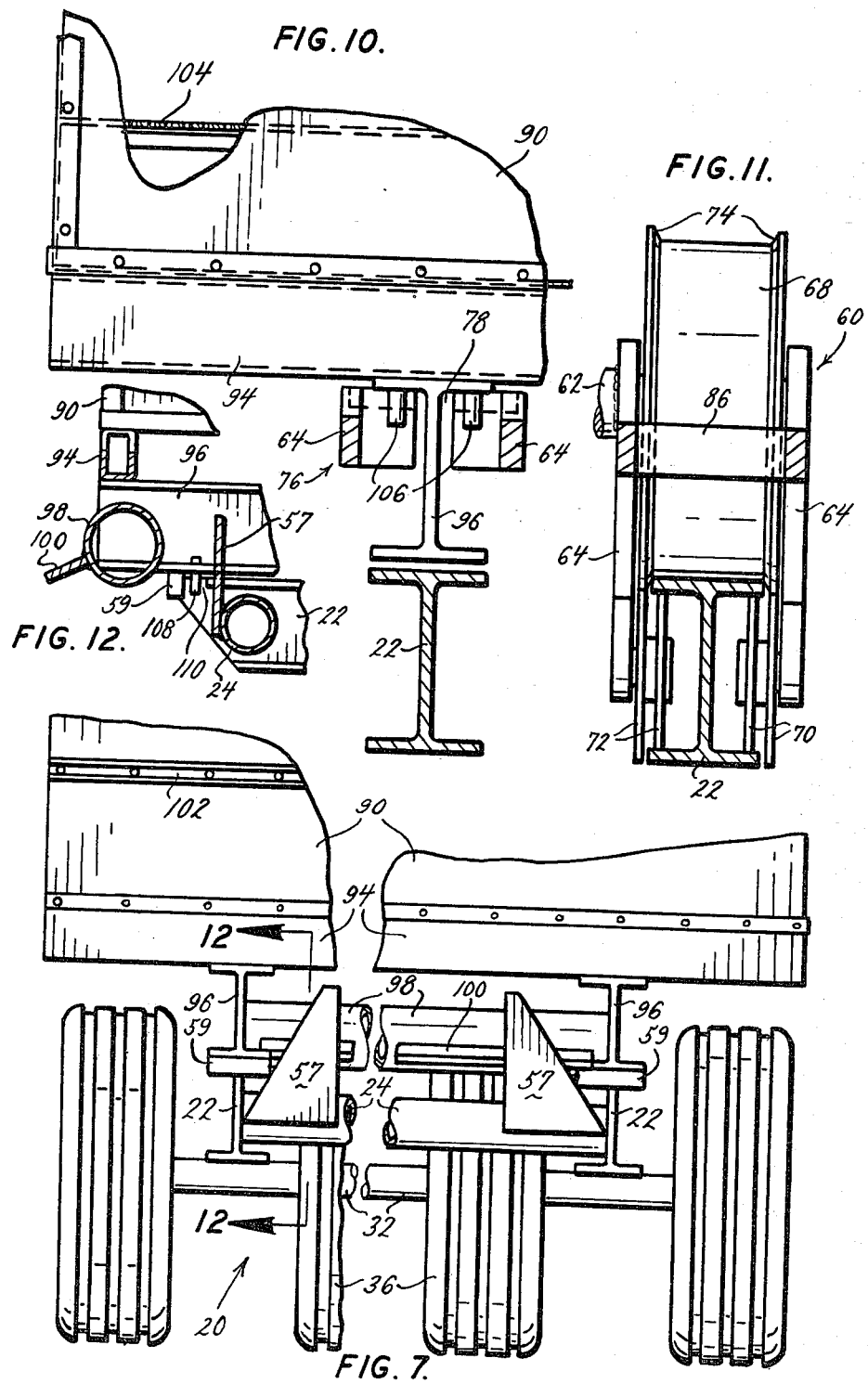

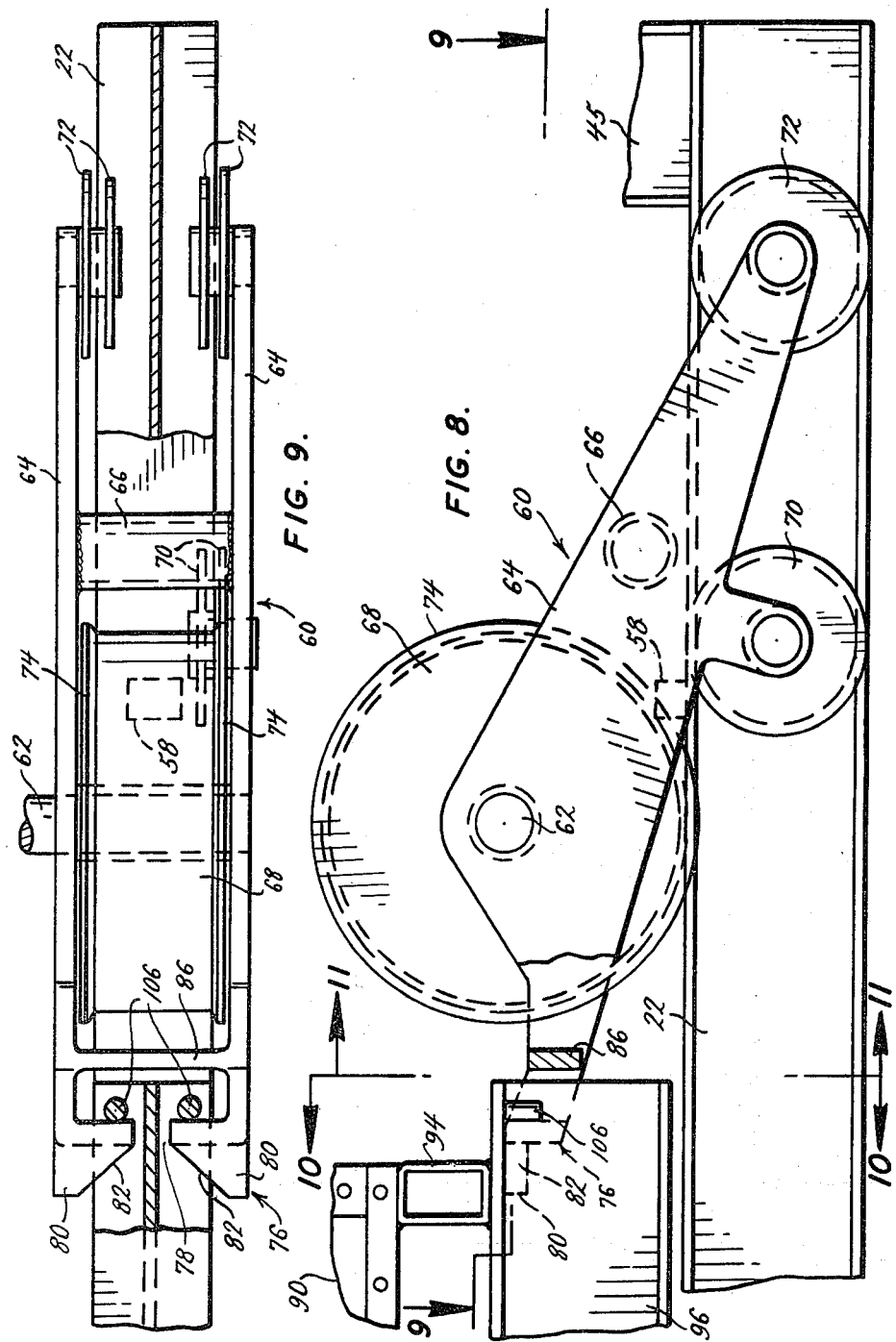

GRAIN TRAILER AND BIN

This is a divisional application of U.S. application Ser. No. 876,360, filed Feb. 6, 1978.

BACKGROUND AND SUMMARY OF THE INVENTION

Modern harvesters, such as combines and corn pickers, are highly efficient at harvesting large quantities of grain in a very short time. These large mechanized devices can very rapidly pick or thresh a large farm in a very short time. However, the technology to handle the grain, once harvested, has not kept pace with the modern harvesting devices. For example, a modern combine can harvest more grain in a few hours than a fleet of trucks can collect and carry to storage in an entire day. It is very common to see combines and cornpickers idle during most of the harvesting period due to their having harvested much more grain than the transportation facilities can carry away to storage. Often every available truck may be utilized in transporting grain to a central storage facility and still have the harvesters idle for the greater part of the time.

Storage and handling facilities also have not been able to keep pace with the harvesting machinery. It is very common during harvest season to see grain stored in the open on the ground, exposed to the elements, dirt, vermin and contamination, since all the available storage space in the grain elevators is occupied and/or the material handling facilities were not capable of handling the hugh influx of grain within the time allotted. Transportation facilities for taking grain from central elevators to the points of milling and use are also inadequate during the harvest season.

These factors all contribute to waste and degradation of harvested grain and to inefficient and uneconomical use of harvesting and transporting machinery. Moreover, during the harvesting season when grain is in abundance and the capacity of the storage facilities are taxed, the price of the grain inevitably is driven down. The farmer with no storage capacity of his own must sell at a very depressed market price or must pay storage costs on that grain until the market will pay an acceptable price.

Applicant has developed an alternative means of storing and transporting grain, as it is harvested, which allows the grain to be stored at the site of harvest and does not require extensive long distance transportation of the grain at the time it is harvested to a centralized storage facility. By eliminating the necessity of intermediate hauling, the limitations of the transportation network are avoided. The method uses a compact, inexpensive and light weight storage bin which can be towed beside the harvesting machinery and filled as harvesting is in progress. When the bin is filled it can be dropped at that point and a new bin substituted so that harvesting can continue without delay or hesitation. The bin is designed to be weather tight and vermin proof. It can be stored permanently where dropped or it can be moved, by a trailer designed to cooperate with the bin, to another place of permanent storage or use for the grain. Transportation need not be immediate, but can be done when the time is convenient, so that there is no inefficiency or undue expense involved.

the trailer used with the bin is designed so that the moving and expensive mechanical parts are designed into the trailer, rather than into the bin, which allows the bin to be reproduced many times at a minimum of expense. Even though this adds somewhat to the expense of the trailer, one trailer can be used in cooperation with many bins and the overall cost of the system is thereby greatly reduced. The bin and trailer can be operated by a normal farm tractor or by any suitably equipped truck or other vehicle. If the tractor or other vehicle is equipped with suitable road speed gearing, it can be used to haul the trailer and bins reasonably long distances to transport the grain and bins to market. Alternatively, the bin can be off-loaded onto a truck.

The trailer can also be equipped with a plenum type bottom having a foraminous upper member so that it can be used in cooperation with an auxiliary grain dryer. It is also contemplated that, by use of the false bottom and suitably rain shielded top vent, air drying of the grain stored in the bin could be effected without the use of auxiliary heat, thereby allowing a reduction of expense. The mass of grain in the trailer will be considerably smaller than that of a conventional storage elevator and normal circulation of air would be sufficient to provide adequate drying in many instances.

The trailer and bin can be loaded and unloaded by one operator using a conventional tractor with an auxiliary power mechanism, such as hydraulic or electric power, without necessitating the operator leaving the tractor. When loaded on the trailer the weight of the bin is distributed so that it can be readily towed at road speeds, such as provided by conventional farm tractors having road gear. The trailer is designed with automatic guides and latches which make it possible to readily load and unload a bin on the trailer without additional persons to help guide and attach the bin to the trailer. The bin is provided with loading hatches and dump doors to enable the bin to be loaded directly from a moving combine or corn picker and to allow the grain to be dumped into automatic materials handling systems, e.g., through grate loading mechanisms.

Although applicant has provided a bin superstructure to the pallet undercarriage, any other suitable superstructure may be provided to accomodate other types of cargo. Thus, applicant's trailer and pallet combination may be used to store and transport almost any type of farm product as well as industrial products including any machinery or machine tools which are normally palletized for shipping. It is only required for applicant's structure and method that the product or object being handled be capable of being supported on a pallet or in a structure which may be mounted on a pallet. Therefore, applicant's structure and method may be used with the vast majority of products and equipment made and sold today.

Other objects of the invention will be apparent to those skilled in the art to which the invention pertains from the following description taken in connection with the accompanying illustrations.

DESCRIPTION OF THE DRAWINGS

FIG. 1 is a side elevational view of applicant's trailer in position to engage applicant's bin;

FIG. 2 is a broken view of applicant's trailer showing the sequence of bin engaging;

FIG. 3 is a broken view of applicant's trailer showing initial engagement with the bin;

FIG. 4 is a partial side elevational view of applicant's trailer and a fully loaded bin;

FIG. 5 is a top plan view of applicant's trailer;

FIG. 7 is a broken sectional view of applicant's trailer and bin shown in FIG. 4;

FIG. 8 is a broken side elevational view of applicant's trailer and bin showing the trailer;

FIG. 9 is a top plan view of FIG. 8 in partial section;

FIG. 10 is a broken partial end view of FIGS. 8 and 9 in partial section;

FIG. 11 is a broken partial sectional view of applicant's trucks positioned on applicant's trailer rails; and FIG. 12 is a partial side view of applicant's bin in partial section.

DESCRIPTION OF THE PREFERRED EMBODIMENT

Figure 6:
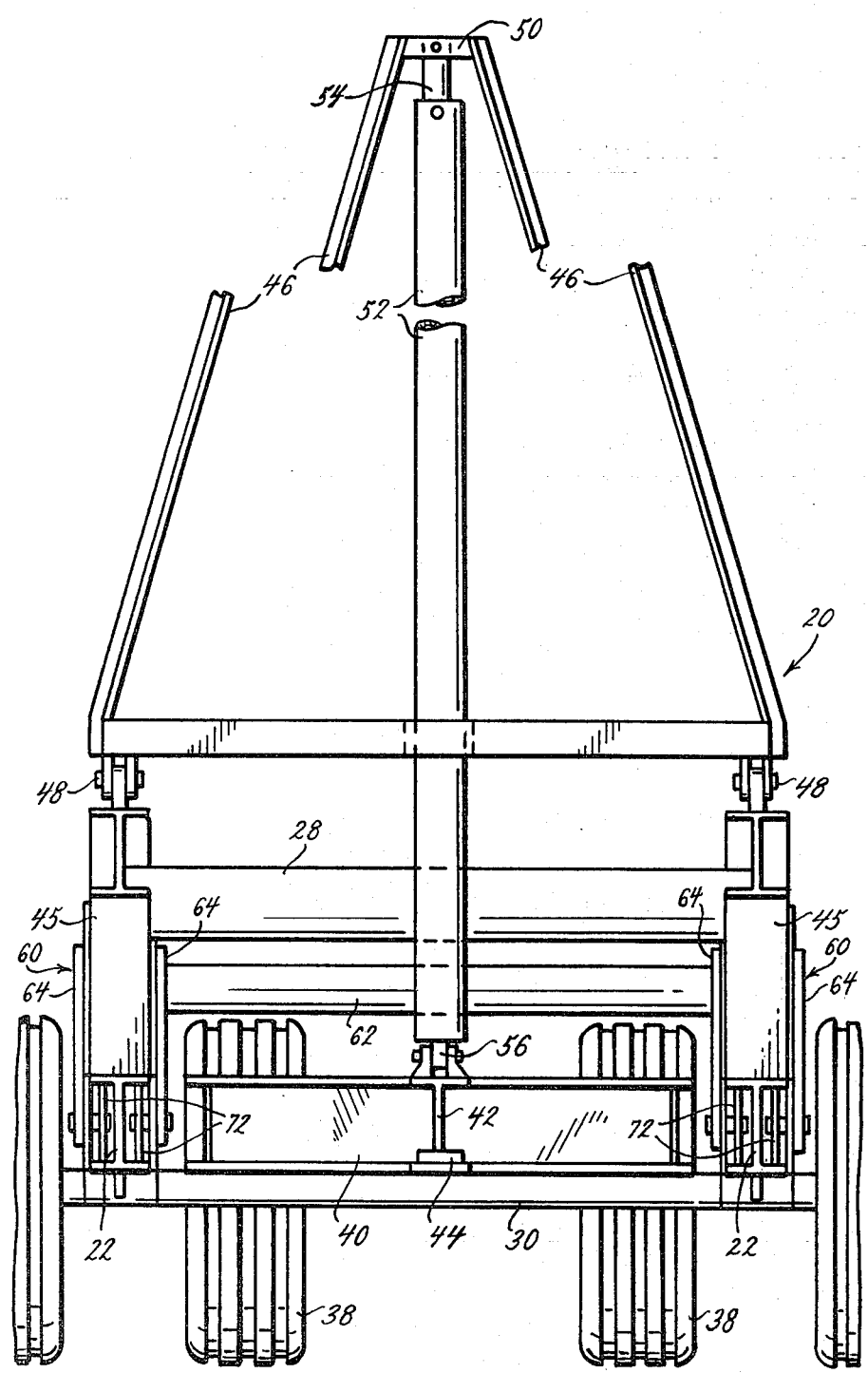
FIG. 6 is a front broken view of applicant's trailer shown in FIG. 5.

Referring in more detail to the drawings, FIGS. 1 and 4 show a trailer 20 of applicant's invention. The trailer has a parallel set of rails 22, which are shown as form as I-beams, but which could be formed of channels, box members or similar equilivent structures. The rails 22 are fixed in a parallel relationship by transverse stiffening cross members 24 and 28 and have a hinged joint 30, which may be formed of pipe or other suitable structual material. Rails 22 carry tandem sets of axles 32, 34 on which wheel and tire sets 36, 38 are mounted. The wheel and tire sets 36, 38 may be single sets or dual sets, as shown.

A yoke 40 is connected with hinge 30 and extends forwardly of the rails 22, terminating in a single bar 42. Bar 42 carries in its extremity a pin connection 44 for connecting with the towbar of a tractor. Vertical members 45 extend upwardly from the forward extremity of trailer rails 22, as shown. Support 28 joins vertical members 45 and passes above the yoke and bar 40, 42. An A-frame 46 is mounted above uprights 45 and is connected thereto at pivots 48. Extending between yoke and bar 40, 42 and the uppermost portion 50 of A-frame 46 is a double acting hydraulic cylinder 52. Cylinder 52 is attached to the uppermost portion 50 of A-frame 46 by connection with piston 54. Hydraulic cylinder 52 is pivotally mounted to the yoke and bar 40, 42 by pivotal connection 56 at the base of hydraulic cylinder 52. Actuation of the hydraulic cylinder 52 causes the trailer rails 22 and the mechanism attached thereto to pivot about hinge 30 and above yoke-bar 40, 42 as the hydraulic cylinder 52 is extended, as shown in FIG. 1. Hydraulic cylinder 52 may be actuated by an auxiliary power source such as a power take-off system of a farm tractor. Other extensible structure such as a rack and pinion gear mechanism driven by an electric motor or other equivalent mechanism may be used to tilt trailer 22, if desired.

Transverse support 24, at the rear portion of trailer 20, has a pair of inclined guides 57. Guides 57 assist in positioning a bin on trailer 20 in a cooperating relationship, as explained herein. See FIGS. 5 and 7. Trailer rails 22 are provided with stops 58 which limit the forward travel of trucks 60 along rails 22 and stops 59 which limit their rearward travel, see FIG. 4.

A pair of trucks 60 are mounted on trailer rails 22, as shown in FIGS. 8 and 9. The trucks 60 are connected by a shaft 62 which spaces the trucks 60 apart. The trucks 60 are spaced so that they cooperate with trailer rails 22 and with the I-beam supports of a bin, see FIG. 4. Trucks 60 have a bifurcated frame 64 joined by a spacing support 66. The frame 64 contains the main wheel 68 and two sets of guide wheels 70 and 72. Main wheel 68 has flanges 74 which cooperate with trailer rails 22 to center the wheels 68 and retain them on the trailer rails 22. Wheels 70 and 72 are flanged to fit within trailer rails 22 or, as shown in FIG. 9, are formed of compound wheels a portion of which fits within trailer rail 22. Wheels 70 and 72 maintain the trucks 60 in cooperation with the trailer rail 22. Forces acting on the trucks, principally through main wheel 68, cannot move main wheel 68 from its cooperating relationship with trailer rail 22. Wheels 70 and 72, as well as joint shaft 62, insure that the trucks 60 and main wheel 68 remain parallel and in a cooperating relationship with each other and with a pair of trailer rails 22.

The truck frame 64, at its rear most position as shown in FIG. 9, terminates in a rear portion 76 which opens to the rear of the truck through a passage 78. Passage 78 is bounded by terminal portions 80 of the truck frame 64 which have inclined surfaces 82 which assist in centering a bin on truck wheels 68, as is explained hereinafter. The inner portions of 84 define a narrow passage through which the web of a bin I-beam may be received, as shown. A cross member 86 may be provided on truck frame 64 for increased strength and rigidity.

Bins 90, shown in FIGS. 7, 11 and 12, may be used with trailer 20. Bins 90 may be constructed of sheet metal braced, as shown, for rigidity. Bins 90 may have a dump door (not shown) on the rear side and loading door (not shown), on the top. The bins 90 may be constructed of any sheet metal, preferably of light weight, such as aluminum, steel, stainless steel, galvanized steel or similar materials. A bin 90 has a series of transverse channel members 94 which form the basic sub-structure of the bin 90. Channels 94 are attached to parallel I-beams 96, which extend generally at right angles to the channel members 94, as shown. The I-beams 96 may be joined at one end by a transverse brace member 98, which may have a flange 100 as shown in FIG. 12. Transverse member 98 adds additional bearing surface when the bin is tipped, as described herein. Flange 100 provides an edge which can dig into the earth slightly and resist forces tending to slide the bin to the rear. It should be understood that the cross-bracing on the bin is sufficient to provide enough rigidity in the bin that it can be transported or moved about without damaging the structure. The cross-bracing and binding, for example shown at 102, is sufficiently strong that the bin can be filled with grain or other materials and still retain its structual integrity. The joints of the bin may be caulked or sealed with appropriate means to protect against weather, or vermin which would damage the grain or other materials stored therein. Bin 90 may also be provided with a foraminous floor 104 in a false bottom structure, as shown. Means may be provided to provide an inlet for forced hot air (not shown), from a grain dryer to dry the grain. The bin also may be provided with a suitable vent (not shown), so that ambient air could circulate through the mass of grain stored in the bin to provide natural convection drying.

I-beams 96 of bin 90 have depending pins 106 extending downwardly from the upper flanges of I-beams 96. Pins 106 are located at the forward end of I-beams 96. See FIG. 11. Pins 106 cooperate with trucks 60 as explained herein; see FIG. 9. Pins 108 may also be provided at the rear end of I-beams 96 and which are received by recesses 110 adjacent stops 59 to secure the bin as explained below. See FIG. 12.

OPERATION

The operation of applicant's trailer and bin combination will be explained assuming that a bin 90 is resting on the ground and it is desired to pick up the bin 90 and to transport it with trailer 20. The trailer 20 is first backed toward the front edge of bin 90, shown to the left of FIG. 1 with the trailer rails 22 parallel to and extending along the axes of I-beams 96. As the trailer 20 approaches the bin 90 hydraulic cylinder 52 is actuated. Piston 54 of hydraulic cylinder 52 extends and pivots trailer rails 22 about hinge connection 30. The piston 54 is extended to the point that trailer wheel and tire sets 36, 38 are lifted away from contact with the ground and the rear end of trailer 20 contacts the ground. The rotation of rails 22 is continued until the rails extend at approximately a 45° angle to the horizontal, as shown. At this point trucks 60 have moved to the end of rails 22 and contact rear stops 59. The trailer 20 is then backed into contact with the forward end of bin 90 and aligned so that open ends 76 of trucks 60 pass beneath pins 106 on I-beams 96 of bin 90. The webs of I-beams 96 pass through openings 78 in the rear of the frames 64 of trucks 60. See FIG. 9.

At this point, the I-beams 96 of bin 90 are aligned with trailer rails 22. The hydraulic cylinder 52 is then reversed to pivot trailer rails 22 about hinge 30 to an angle of about 30° to the horizontal. At this angle, pins 106 are engaged by the rear portions 76 of trucks 60 and the front end of bin 90 is lifted free of the ground. See FIGS. 1–3. Trailer 20 is then forced underneath bin 90. Bin 90 remains engaged to truck 60, by pin 106, and the front edge of bin 90 is held above the surface of trailer rails 22. The bin 90 continues to tilt as the trailer 20 is backed beneath it. Trucks 60 continue to travel forwardly up inclined rails 22 until they engage stop blocks 58 at which point the bin 90 is fully resting over the trailer 20. During the progress of the bin 90 onto trailer 20 inclined guide bars 57 abut against the inside edges of bin I-beams 96 to maintain the I-beams 96 centered above trailer rails 22.

When the bin 90 is positioned over trailer 20 the piston 54 of hydraulic cylinder 52 is fully telescoped back into the hydraulic cylinder 52, returning the trailer rails 22 to the horizontal position. As the rails 22 reach the horizontal position, pins 108, which extend below the level of rails 22, are received into recesses 110 directly in front of stops 59 at the rearward portion of bin 90 to fix the bin on the trailer and prevent it from moving rearwardly. Stops 58 on trailer rails 22 prevent the forward motion of truck 60 which continues to engage pin 106 to prevent forward motion of bin 90. It will be appreciated that cooperating pin fasteners or other safety means may be used to retain bin 90 on trailer 20, if desired.

To off-load bin 90, the loading process is conducted in reverse order so that the trailer 20 can be slid from under bin 90 after having been elevated to approximately a 30° angle. After the bin has been offloaded the bin is raised to a 45° angle to allow catch pin 106 to clear the rearward portion of trucks 60 and slide freely out of the frame 64.

Various modifications will be readily apparent to those skilled in the art after consideration of the foregoing specification and drawings. Accordingly it is not desired to limit the invention to the exact construction shown and described, but to limit it only by the scope of the claims appended hereto.

I claim:

1. A bin for storing, transporting and protecting materials comprising an enclosure, the enclosure being reinforced to withstand internal and external forces applied thereto and being weather proof and vermin proof, the bin superstructure being mounted on a support and the support being mounted on and connected to a set of parallel beams, and wherein the beams have downwardly extending catch pins at their forward extremities for cooperating with and being retained by an attaching structure whereby the bin may be mounted on a trailer, the catch pins extending from upper portions of the beams and being engageable and retainable by cooperating trailer structure, the beams having latch pins at the rearward portions of the beams for engaging a cooperating stop on a trailer mechanism to prevent rearward displacement of the bins from the trailer, when mounted thereon.

2. The bin of claim 1 wherein the bin has a false bottom with the upper floor thereof being foraminous, allowing air to be passed upward through the material stored in the bin for drying or treatment thereof.

3. The bin of claim 1 wherein the beams have catch pins at their forward extremity for cooperating with and being retained by an attaching structure and whereby the bin may be mounted on a trailer.

4. The bin of claim 1 wherein the bin has latching pins at the rearward extremity of the bin for latching to a cooperating portion of a trailer to retain the bin thereon.

5. The bin of claim 1 wherein the support is a plurality of spaced parallel channels mounted transversely to the set of parallel beams.

6. The bin of claim 1 wherein the parallel beams are a set of I-beams.

7. The bin of claim 1 wherein the bin has opening means for loading and unloading the bin.

8. The bin of claim 1 wherein the bin has a ground engaging support at its rear extremity, the ground engaging support extending transversely to the set of parallel beams.

9. The bin of claim 1 wherein the set of parallel beams is a set of I-beams having spaced depending catch pins at the forward extremity of the upper flanges extending downwardly in a spaced relationship on opposite sides of the webs of the I-beams and adapted to engage cooperating latching means, the rearward extremity of the I-beams having depending latching pins on the lower surface of the lower flange of the I-beams adapted to engage a cooperating stop means to prevent rearward displacement of the bin in relation to the stop means, the beams having at their rearward extremity a transversely extending ground engaging tube to provide additional support for the structure when resting on the ground, the ground engaging tube having a flange mounted thereon and extending outwardly therefrom at an angle adapted to intersect the ground when the bin is resting thereon and to impinge on the ground when the bin is pivoted about the ground engaging tube to resist rearward movement of the bin, the bin having a foraminous false bottom and means allowing air circulation through the bin to dry materials stored therein.

10. The bin of claim 8 wherein an anti-skid means is attached to the ground engaging support.

* * * * *